US005245545A

United States Patent [19]

Taylor

[11] Patent Number: 5,245,545

[45] Date of Patent: Sep. 14, 1993

[54] APPARATUS AND METHOD FOR VARIABLE WEIGHT MAIL PROCESSING

[75] Inventor: Michael P. Taylor, Norwalk, Conn.

[73] Assignee: Pitney Bowes Inc., Stamford, Conn.

[21] Appl. No.: 779,453

[22] Filed: Oct. 18, 1991

[51] Int. Cl.[5] ........................ G06F 15/20; G07B 17/00

[52] U.S. Cl. ................................ 364/478; 364/464.03

[58] Field of Search ............... 364/478, 464.02, 464.03

[56] References Cited

U.S. PATENT DOCUMENTS

| | | | |
|---|---|---|---|
| 4,506,330 | 3/1985 | Dlugos | 364/466 |
| 4,797,830 | 1/1989 | Baggarly et al. | 364/464.03 |
| 4,817,042 | 3/1989 | Pintsov | 364/478 |
| 4,868,757 | 9/1989 | Gil | 364/464.03 |
| 4,947,333 | 8/1990 | Sansone et al. | 364/464.02 |
| 4,962,454 | 10/1990 | Sansone et al. | 364/464.02 |
| 5,019,991 | 5/1991 | Sansone et al. | 364/464.03 |

*Primary Examiner*—Jerry Smith
*Assistant Examiner*—Paul Gordon
*Attorney, Agent, or Firm*—Peter Vrahotes; Melvin J. Scolnick

[57] ABSTRACT

This invention relates to apparatus and method for the presentation of mail to the post office with assurance that postage has been paid for each mail piece. It is more particularly concerned with mail on which there is no evidence of postage payment, such as permit mail. This is accomplished by weighing each mail piece to determine the weight, packaging the mail either in batches with a fixed weight or in batches with variable weight that gives but fixed stack dimension and sending a statement sheet to the post office that gives the number of mail pieces in a batch of mail, the weight of the batch and the postage due.

10 Claims, 1 Drawing Sheet

APPARATUS AND METHOD FOR VARIABLE WEIGHT MAIL PROCESSING

RELATED PATENT AND PATENT APPLICATIONS

Attention is directed to U.S. patent application Ser. No. 07/459,418 filed Jan. 2, 1990 and entitled Mail Piece Weight Quality Control System and Method; U.S. Pat. No. 5,005,124 entitled Method and Apparatus for Categorizing and Certifying Mail; U.S. Pat. No. 5,007,694 entitled Distribution Mailing System Having a Control Database for Storing Mail Handling Categories Common to the Databases of Selected Mailer Stations; U.S. patent application Ser. No. 07/282,713 filed Dec. 13, 1988 and entitled Apparatus and Method for the Processing of Mail; and U.S. Pat. No. 5,142,482, entitled Mailing System with Information Feedback.

BACKGROUND OF THE INVENTION

Mail presented to the post office for delivery is required to have sufficient postage. A discount is provided to high volume mailers when the mail presented to the post office meets an elaborate set of preparation requirements. These presort requirements cover physical order of the mail pieces, proof of postage for each mail piece and documentation for the mail run. Ascertaining appropriate payment of postage is often a problem when no indication of postage payment, such as a postage indicia, is present on the mail pieces.

Acceptance of the mail by the post office usually involves using a scale to weigh individual mail pieces and a calculation of the number of mail pieces. This is then multiplied by the piece postage rate to determine total postage required. The physical order of the mail is checked against the mail's documentation and presort requirements. Groups of mail pieces that do not meet presort requirements are called residual mail pieces which require additional postage. Mixing of non-identical weight pieces in a single run inhibits the ability of the post office to calculate a piece count by using a scale. By taking advantage of the ratio of mail pieces vs. conventional scale round off, it is possible for a mailer, or other individual, to "salt" the mail run with mail pieces for which no postage has been paid. By "salting" is meant the adding of mail pieces for which postage has not been paid.

Although "salting" is not a problem with mail pieces that have an indication of postage payment thereon, such as a postage printed indicia or a postage stamp, permit mail and manifest mail presents a problem, because there is no such evidencing of the payment of the postage on the face of the mail piece and the post office must rely upon the representations and presentations of the mailer upon acceptance of the mail therefrom. As was stated previously, although measures can be taken to assure that the number of mail pieces in a tray is correct when the mail pieces have substantially the same weight, there is no easy method of doing this with a batch of mail in which the weight of the mail pieces varies from piece to piece.

Clearly, it would be advantageous to provide a system and method whereby a mail batch containing mail pieces with different weights can be presented to the post office in such a way that the post office is assured that sufficient postage payment has been made for the mail received from a mailer.

SUMMARY OF THE INVENTION

It has been found that using a high speed scale having the accuracy to weigh individual mail pieces within the tolerances provided by the post office makes it possible to devise a system which assures accurate determination of the payment of postage and would uncover "salting" of a mail run. An example of such a scale is shown and described in U.S. Pat. No. 4,778,018. Such a high speed scale can be used in a system operating either in one of two modes, the first mode, the scale is used to accumulate individual mail piece weights into an aggregate or batch weight of predetermined weight such as eight ounces. The composition of the batch is determined by a processor having a mail list and could be a batch of mail pieces with identical five digit zip codes or three digit zip codes. The scale to determine the maximum number of envelopes which will comprise a batch without exceeding the predetermined batch weight limit. Each batch would weigh close to the same amount making easier for the mailer or post office to verify the total weight. If anyone were to add mail pieces to the batch for which postage had not been paid, subsequent inspection of the batch would reveal the same because of the discrepancy in weight.

In the second mode, the scale is used to determine the weight of a batch of mail comprised of a plurality of mail pieces with the same five digit or three digit zip code that is placed in a tray in fixed batch dimension. The weight of each batch would be included in a manifest like printout for verification by the mailer or by the post office.

DETAILED DESCRIPTION OF THE PREFERRED EMBODIMENT

Figure 1:
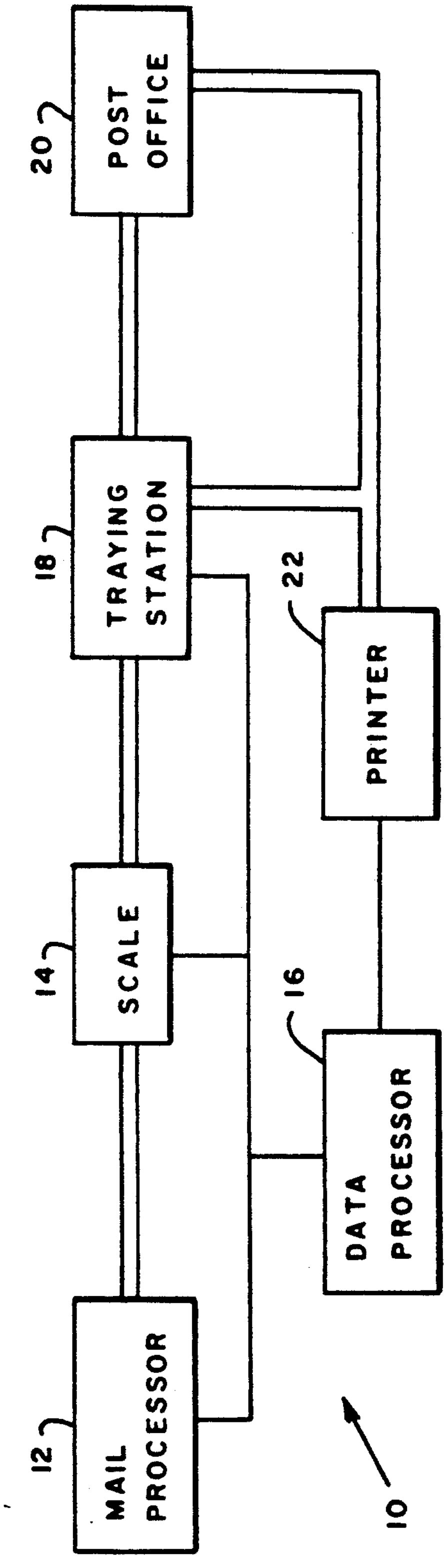
FIG. 1 shows a system in which the instant invention can be practiced.

With reference to FIG. 1, a system is shown generally at 10 which can be used by a high volume mailer to either form mail batches of pre-determined weight or for determining the weight of mail containing trays that are to be sent to a post office. The system includes the functions of inserting, sealing, sorting, and a mail processor 12 counting of mail pieces according to zip codes printed thereon. Downstream from the mail processor 12 is a scale 14 that receives mail pieces individually from the mail processor 12. Both the mail processor 12 and the scale 14 are in communication with a data processor 16. The data processor can be one of any number of commercially available computers such as an I.B.M. AT personal computer. Downstream from the scale 14 is a traying station 18 where the mail pieces are placed into trays. A post office 20 is shown which will receive the trays of mail. In FIG. 1, double arrows are used to indicate conveyance of mail pieces from the mail processor to the scale 14 to the traying station, and to the Post Office 20. Such conveying mechanisms are well known in the art and will not be discussed in detail. Single lines are shown for the purpose of indicating electrical communication between various units for the purpose of providing data communication therebetween.

Figure 2A:
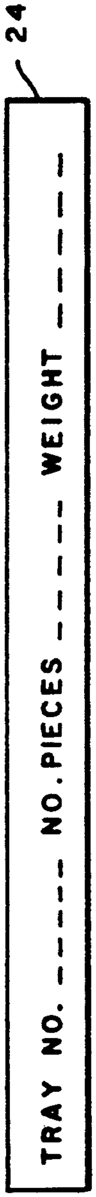
FIG. 2A and 2B show statement sheets that are produced by the system shown in FIG. 1.
Figure 2B:
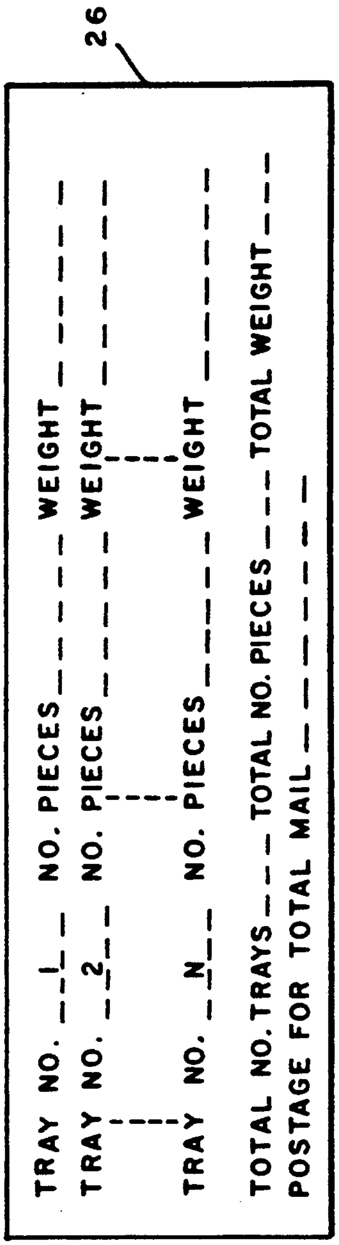

With reference to FIG. 2, a statement sheet 24 is shown of the type that will accompany a tray for describing the contents of the tray. FIG. 2B shows the statement sheet that will be supplied to the post office for providing information relative to a run of mail that will include one or more trays.

In operation, mail is first assembled in any one of a number of well known techniques with a zip code designation such as by the 3 digit zip code or 5 digit zip code. Mail pieces processed by an inserter, which is part of the mail processor, will have dash codes thereon indicating the zip code to which the mail is to be sent. As the mail is being processed the mail processor 12 will determine from the dash codes when a change in zip code takes place. Such zip code brakes can be evidenced by a marking on the mail piece that starts a new zip code and the mail pieces will be sorted or segregated in accordance with their zip code designations. The zip code brake can be a different five digit code or a different three digit zip code. After zip code identification, the mail pieces are conveyed in series to the scale 14 by any convenient conveying means. The scale 14 must be a high speed scale capable of weighing with the tolerance of postal requirements, such as that shown and described in the U.S. Pat. No. 4,778,018. Both the mail processing unit 12 and the scale 14 upload data to the data processor 16 relative to the mail that is being processed. The mail processing unit 12 will send to the data processor 16 the number of mail pieces being processed as well as the zip codes of these mail pieces. The scale 14 will send data to the data processor 16 relative to the weight of each mail piece. The data processor 16 will determine the postage required based on the individual weight of the mail pieces, the number of mail pieces and the class of mail. Thereafter the mail pieces will be trayed by any convenient manner so that mail is transferred from the scale to a tray in accordance with the zip code brakes. More specifically, each tray 18 will contain mail that has the same 3 digit zip code, but can contain the same 5 digit zips therein if the mailer has a sufficiently high volume of mail.

Upon receipt of data from the mail processing unit 12 and scale 14, the data processor 16 will be in a position to determine the number and the weight of mail pieces placed into a tray 18. The data processor can determine when a predetermined weight of mail pieces has been reached and cause that quantity of mail to be placed in a tray. Such a fixed batch weight can be banded, placed in a tray or both. Alternatively, a fixed stack dimension can be achieved, such as the length of a tray. By stack dimension is meant that dimension that varies as mail pieces are stacked face to face. Where all the mail pieces are identical, the number of mail pieces in a fixed batch dimension would be the same from tray to tray. But, when the mail pieces are of variable weight, a determination must be made as to the number of mail pieces required to obtain a fixed batch dimension. This is achieved by coordination between the traying station 18 and the data processor 16 wherein the data processor will make a determination of the thickness of mail pieces based upon the weights thereof and the traying station will fill a tray of mail under control of the data processor. In either case, the data processor will cause the printer 22 to print two statement sheets, one statement sheet 24 for attachment to the tray 18 and the other statement sheet for the benefit of the post office 26. It will be appreciated that there will be instances when the number of mail pieces of a given zip code is not sufficient to either form a fixed weight batch or a fixed stack dimension batch. This occurs when there is an insufficient number of mail pieces for a given zip code at the outset or there are mail pieces left over. Such mail pieces do not fit in the general scheme of this invention and would be required to be processed separately.

The first statement sheet 24 will simply indicate the tray number into which the mail pieces are placed, the number of mail pieces in that tray and the total weight of the mail pieces and tray. The second statement sheet 26 is one that will be sent to the post office 20 and would include a summary of all the trays that have been processed as well as the weight of each mail filled tray and the total postage required for all the mail included within statement sheet 26. Although the number of mail pieces is represented by the statement sheets, 24, and 26 it will be appreciated that the weight data is controlling in determining accuracy of the postage due or paid. Even though the left over mail pieces will not form a fixed weight batch or a fixed stack dimension, they would be included in the totals of statement sheet 26.

In this way, individual trays can be weighed and the weight of the trays with the mail therein can be checked taking into account the tare weight of the tray. By doing this, one can determine if the correct number of mail pieces has been placed inside of the trays and if the postage paid is sufficient. If there is a discrepancy, the tray contents can be inspected more closely to see whether there has been an attempt to fraudulently add more mail or whether the system has erred.

Thus what has been shown and described is a system and method whereby the post office is able to receive mail assurances that can be easily checked to determine if the postage has been paid on all the mail received for delivery.

What is claimed is:

1. A system for providing an easy, fast opportunity to a post office to determine accuracy of postage paid for a batch of mail, comprising:

a mail processing unit for assembling mail pieces and identifying assembled mail pieces in accordance with their zip codes, a scale located downstream from said mail processing unit for weighing each mail piece, a data processor in communication with said mail processing unit and said scale for receiving zip code information from said processing unit and weighed information from said scale, a traying station for receiving mail pieces after being weighted by said scale for placing mail pieces into trays, and a printer in communication with said data processor for printing a statement concerning the number and weight of the mail pieces in a tray.

2. The system of claim 1 wherein said traying station will place a fixed weight batch of mail in a tray under control of data received from the data processor.

3. The system of claim 1 wherein said traying station causes a fixed stack dimension of mail pieces to be placed in a tray and the weight of the batch of mail in said tray is determined by said data processor.

4. A system providing an easy, fast scheme to a post office to determine if a weight in a batch of variable weight mail pieces has correct postage, comprising:

mail processing means for assembling mail pieces and segregating the mail pieces in accordance with their zip codes, means for weighing the mail pieces individually, processor means in communication with said mail processing means and said weighing means for receiving information relative to the number of mail pieces being processed and the zip codes thereof and the weight and postage required therefor, means in communication with said processor means for receiving the mail pieces after being weighed and assembling them as a batch of mail having the same zip code designation, and means for printing a statement sheet showing the weight of the batch of mail and postage therefor.

5. The system of claim 4 wherein said processor means causes said batch of mail to have a fixed weight.

6. The system of claim 4 wherein said processor means in cooperation with said traying station to produce a batch of mail pieces having a fixed stack dimension.

7. A method of providing an easy, fast opportunity to a post office for determining postage for mail pieces to be delivered by the post office, comprising the steps of:

forming mail pieces sorting and counting the mail pieces in accordance with a zip code designation;

weighing each mail piece;

assembling the mail pieces into a batch;

determining the weight of the batch of mail pieces;

determining the postage required to post the batch of mail; and printing a statement sheet indicating the weight and number of mail pieces in a batch of mail.

8. The method of claim 7 wherein the mail pieces are assembled into batches of fixed weight.

9. The method of claim 7 wherein the mail pieces are assembled into batches of fixed stack dimension.

10. The method of claim 9 wherein said batch of mail pieces is placed in a tray.

* * * * *